(12) United States Patent
Piskun

(10) Patent No.: US 10,746,872 B2
(45) Date of Patent: Aug. 18, 2020

(54) SYSTEM OF TRACKING ACOUSTIC SIGNAL RECEIVERS

(71) Applicant: Vadim Piskun, San Jose, CA (US)

(72) Inventor: Vadim Piskun, San Jose, CA (US)

(*) Notice: Subject to any disclaimer, the term of this patent is extended or adjusted under 35 U.S.C. 154(b) by 285 days.

(21) Appl. No.: 15/984,094

(22) Filed: May 18, 2018

(65) Prior Publication Data

US 2019/0353781 A1 Nov. 21, 2019

(51) Int. Cl.
G01S 15/02 (2006.01)
G01S 15/06 (2006.01)
G01S 15/88 (2006.01)
H04R 1/40 (2006.01)
G01S 15/86 (2020.01)

(52) U.S. Cl.
CPC .............. G01S 15/86 (2020.01); G01S 15/06 (2013.01); G01S 15/88 (2013.01); H04R 1/403 (2013.01)

(58) Field of Classification Search
CPC .......... G01S 15/86; G01S 15/06; G01S 15/88; G01S 15/66; H04R 1/403; H04R 17/00; H04R 29/002; H04R 2201/401; H04R 2203/12; H04S 7/303
See application file for complete search history.

(56) References Cited

U.S. PATENT DOCUMENTS

| 7,515,719 | B2 | 4/2009 | Hooley et al. |
| 2008/0159571 | A1 | 7/2008 | Hooley |
| 2011/0129101 | A1 | 6/2011 | Hooley |
| 2013/0121515 | A1 | 6/2013 | Hooley et al. |
| 2019/0349703 | A1* | 11/2019 | Zilberman ............. G10K 11/34 |
| 2019/0353781 | A1* | 11/2019 | Piskun ................... G01S 15/06 |

* cited by examiner

Primary Examiner — Daniel Pihulic

(57) ABSTRACT

Disclosed is a system of tracking location of the listener's ears for 3D perception of audio signals sent from an array of acoustic sources. In addition to the array of acoustic sources, the system contains a video camera for finding a location of the listener's ears and one or more ultrasonic transducers for locating positions of the listener's ears by sending ultrasonic signals and receiving echoes reflected from the sought objects. The use of ultrasonic transducers enhances the action of the video camera and accuracy in positioning the listener's ears by calculating the distance from the acoustic sources to the plane in which the ears are located in the direction of axis Z, while the X, Y coordinates of the ears in the X, Y, Z coordinate system are determined by an image processor of the video camera.

2 Claims, 5 Drawing Sheets

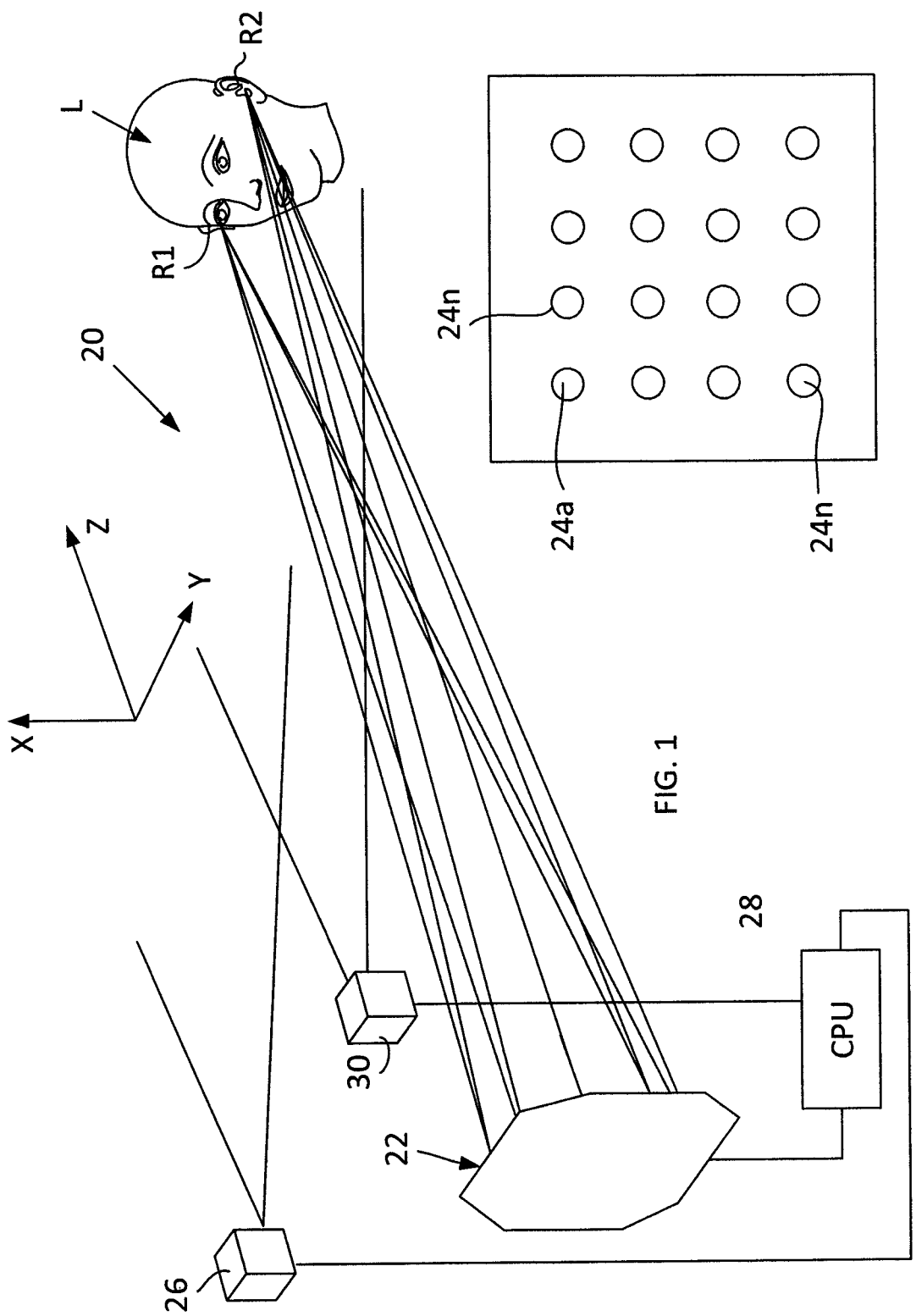

SYSTEM OF TRACKING ACOUSTIC SIGNAL RECEIVERS

FIELD OF THE INVENTION

The present invention relates to a speaker system and in particular to a system of tracking acoustic signal receivers, more specifically listener's ears, for controlling a speaker system's directivity and focusing of sound beams acoustically in combination with optical means.

BACKGROUND OF THE INVENTION

For headphone-less speaker systems directivity of sound is one of the most important characteristics to provide efficient performance of the speakers and three-dimensional perception of sounds by a sound receiver. Directivity is based on the fact that the magnitude of a sound pressure differs depending on direction. There exists a great variety of speaker systems aimed at generation of directional acoustic beams, wherein designs and structures of such system also varies in a wide range depending on specific purpose of the system applications. The speaker systems for directional sound generation, in which the speakers are organized in regular patterns or matrix structure, find wide practical application and are in constant development and improvement. Especially popular and efficient are speaker systems wherein unit sound emitters are represented by piezo emitters. This is because by controlling the intensities and phase of acoustic beams generated by individual piezo emitters it becomes possible not only to create the converging acoustic beams but also to control direction of the beams to a listener or to a specific part of the listener's body, e.g., the head or ears.

On the other hand, known in the art are combined optoacoustic systems in which a plurality of speakers arranged into a regular array for tracking a listener are with the use of optical camera or cameras that assist in finding the position of a listener or listener's body.

For example, U.S. Patent Application Publication No. 20080159571 (Published on July 2008, Inventor: A. Hooley) discloses a portable sound system for use in portable devices such as laptops or mobile phones. The system operates on the principles of parametric sound generation to create a virtual headphone-like system using focusable and steerage beams of ultrasonic sound emitted from a portage phased array or similar source of ultrasonic sound beams, focused at the vicinity of the left and right ear of the user. The system being also capable of producing audible surround sound and adapted to compensate for head motion through use of an optical based tracking system. The platform is fitted with a camera and image-processing software providing at least part of a tracking system as described above. The software analyses the camera captured images when the camera is facing the user of the device and determines from those camera images the location of the head of the user, and from that either deduces the ear positions, or further image analysis is used to measure the ear positions or the general head orientation for subsequent deduction of the ear position, if the latter cannot be directly tracked.

U.S. Patent Application Publication No. 20110129101 (Published on Jun. 2, 2011, Inventor: A. Hooley) discloses a directional microphone system that includes an ultrasonic emitter and receiver. The emitter directs a beam of ultrasound at the audio source with sufficient intensity that non-linear air effects cause non-linear interactions between the ultrasonic sound and the source's sonic sound. Ultrasonic frequency-mired sounds are thereby generated and received by the ultrasonic receiver. Signal processing is carried out on the received signals to strip out the audio signals. The emitter and receiver may be co-located and the emitted beam may be focused at the location of the audio source. The receiver may also be directional acid focusable. The directional microphone system may be very small and yet highly directional at sonic including low audible frequencies. Optimization may be carried out by scanning the beam around, or by using the mobile phone's built-in camera (where fitted) to optically detect the position of the user's mouth, or under user control.

U.S. Patent Application Publication No. 20130121515 (Publication Date: May 16, 2013; Inventors: A. Hooley, et al.) discloses combining a head-tracking system, for example a camera system with a plurality of loudspeakers to enhance the audio experience of the user. The location of the user can be used to alter the audio signal sent to the plurality of loudspeakers to improve such functions as surround sound. In addition, the camera system can be used, when combined with an array of loudspeakers that can produce tight beams of sound, to direct different sound beams at different users, with virtually no crosstalk to allow users to experience different media from the same audio system, and which is tolerant of changed user positions. In addition, the camera system can aid setting up the array for real surround sound delivery, which bounces sound beams off wall. Crosstalk cancellation can additionally be used. The sound beams may represent 2-D or 3-D sound sources in real time. Sound beam parameters are adjusted to provide the listener with in impression of the 2-D or 3-D position and movement of sound-producing entities of audio-visual program material in real-time. The beam parameters used include beam-direction, beam focal length, frequency response and gain. Such a Sound Projector producing a real-time representation of 3-D sound sources can be used alone or in conjunction with a video display, a television, a personal computer or a games console.

U.S. Pat. No. 7,515,719 issued on Apr. 7, 2009 to A. Hooley, et al. discloses a method and apparatus for taking an input signal, replicating it a number of times and modifying each of the replicas before routing them to respective output transducers such that a desired sound field is created. This sound field may comprise a directed beam, focused beam or a simulated origin. In a first aspect, delays are added to sound channels to remove the effects of different travelling distances. In a second aspect, a delay is added to a video signal to account for the delays added to the sound channels. In a third aspect, different window functions are applied to each channel to give improved flexibility of use. In a fourth aspect, a smaller extent of transducers is used top output high frequencies than are used to output low frequencies. An array having a larger density of transducers near the center is also provided. In a fifth aspect, a line of elongate transducers is provided to give good directivity in a plane. In a sixth aspect, sound beams are focused in front or behind surfaces to give different beam widths and simulated origins. In a seventh aspect, a camera is used to indicate where sound is directed.

SUMMARY OF THE INVENTION

The present invention relates to a speaker system for controlling the directivity of focused sound beams acoustically in combination with optical means.

The system of tracking acoustic signal receivers (hereinafter referred to as a system of the invention) is intended for 3D perception of audio signals by audio signal receivers, which, in the illustrated case, are listener's ears. The system consists of an array of acoustic sources, for generating audio signals and ultrasonic signals and a visual sensor, e.g., a video camera for finding a location of the acoustic sound receivers, i.e., listener's ears. The acoustic sources of the array are capable of generating focused audio signals and ultrasonic signals and focusing the generated audio signals and ultrasonic signals on the listener's ears. In other words, the array has functions of an acoustic beam focusing and directing. For convenience of illustration and explanation, in the context of the present patent specification, the sound waves are conditionally mentioned as sound beams.

An essential and unique feature of the system of the invention is the use of at least one, preferably at least two ultrasonic transducers for locating positions of the listener's ears by sending ultrasonic signals and receiving echoes reflected from the sought objects, i.e., listener's ears. In the context of the present specification, the term "ultrasonic transducer" covers a device that may use piezoelectric transducers to produce and receive the sound.

The use of ultrasonic transducers enhances the action of the video camera and accuracy in positioning the location of the sought objects by calculating the distance from the acoustic sources to the plane in which the ears are located in the direction of axis Z, while the X, Y coordinates of the ears in the X, Y, Z coordinate system are determined by an image processor of the video camera. The system of the invention further contains an ultrasonic signal modulator for modulating the ultrasonic signals emitted by the array of acoustic sources. The distance and angle of arrival of the reflected signals can be estimated by using different technic for estimating the angle of arrival. Calculations are carried out by using a central processing unit.

BRIEF DESCRIPTION OF THE DRAWINGS

FIG. 1 is a schematic three-dimensional view of an optoacoustic ear tracking system of the invention.

FIG. 2 shows an exemplary pattern of the acoustic sources on the front side of the acoustic source array.

DETAILED DESCRIPTION OF THE INVENTION

Figure 3:
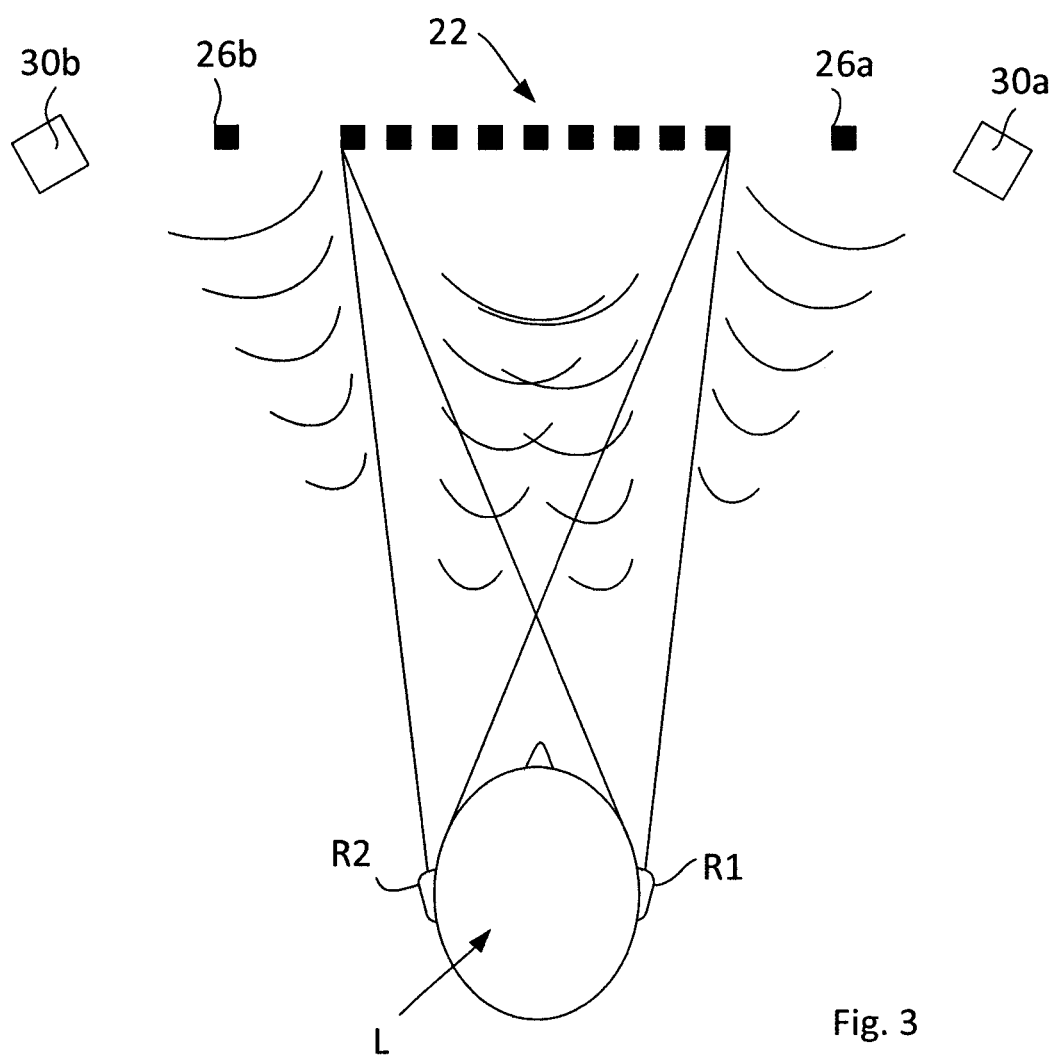
FIG. 3 is a plan view of the system of FIG. 1.

The present invention relates to a speaker system for controlling the directivity of focused sound beams acoustically in combination with optical means.

FIG. 1 is a schematic three-dimensional view of an optoacoustic ear tracking system of the invention, wherein the system in general is designate by reference numeral 20. As can be seen from FIG. 1, the system of the invention 20 consists of an array 22 of a plurality of acoustic sources for generating acoustic signals such as ultrasonic signals and audio signals. An exemplary pattern of the acoustic sources 24a, 24b, ... 24n on the front side of the array is shown in FIG. 2, wherein the front side is the side that faces an object. In the context of the present specification, the object is mentioned as a listener and the listener's ears are mentioned as acoustic sound receivers.

In according to one aspect of the invention, the acoustic sources are arranged at regular distances from each other. Sixteen acoustic sources are shown only as an example and their number may be less or greater than sixteen. Example of acoustic sources suitable for the purposes of the invention are ultrasound traducers of Mindray Series produced by National Ultrasound Co., Ga., USA. The specific series was given only as an example and the company produces such sensors in a wide range.

An essential distinguishing feature of the system of the invention 20 is at least one ultrasonic transducer 26 shown in FIG. 1. Examples of ultrasonic transducer, such as the transducer 26, are temperature compensation ultrasonic of T30UX series of Banner Engineering Co., Minn., USA. The specific series was given only as an example and the company produces such sensors in a wide range.

The at least one ultrasonic transducer 26 is intended for finding a location of the listener's ears by sending ultrasonic signals to the object, i.e., listener's ears, hence, the audio signal receivers, and receiving the echoes of the signals reflected from the audio signal receivers. Strictly speaking, a single ultrasonic transducer may locate only a plane in which the listener's ears are located, and at least two ultrasonic transducers are needed for more accurately measuring distances from the acoustic sources as well as for measuring distances between both audio signal receivers. Such a system with the use of at least two ultrasonic transducers 26a and 26b is shown in FIG. 3, which is a top view on the system in which all components are the same as in FIG. 1, except for the second ultrasonic transducer 26b and a number of the acoustic sources. Reference numeral 28 designates a central processing unit (CPU) which is linked to the ultrasonic transducer 26 (ultrasonic transducers 26a, 26b) for purposes explainer later.

There are some limitations with this approach. Anything that interrupts the beam will prevent the ultrasound from propagating, like interrupting a spotlight's beam. For this reason, most systems are mounted overhead, like lighting.

Another essential component of the system 20 of the invention is at least one visual sensor 30 (FIG. 1). Two such visual sensors 30a and 30b in the form of two digital image-processing video cameras are shown in FIG. 3. It is important to note that the ultrasonic transducer 26 (ultrasonic transducers 26a, 26b) determines a coordinate of the listener's ears in a plane (not shown) perpendicular to an axis Z in an orthogonal coordinate system X, Y, Z.

Figure 4A:
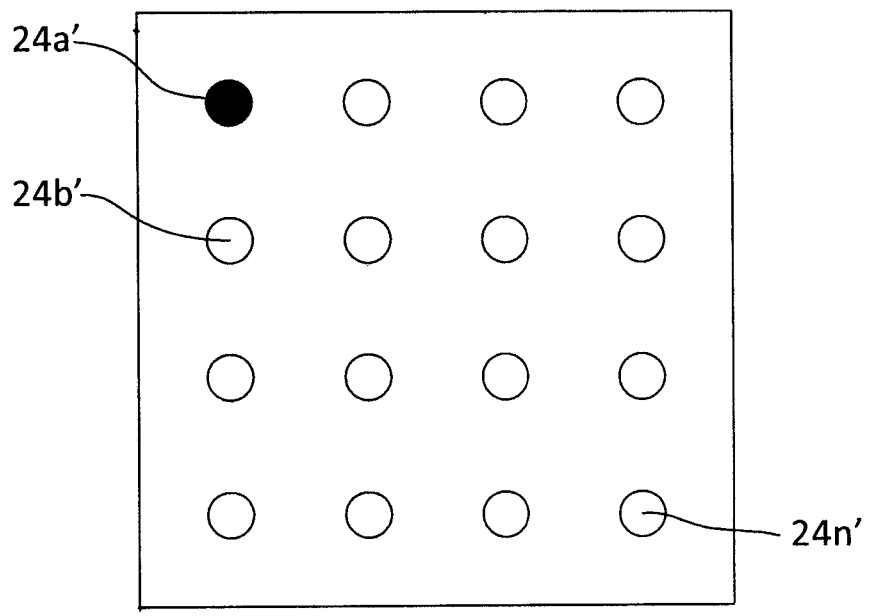
FIG. 4A is a view similar to FIG. 2, wherein one of acoustic sources is used as an ultrasonic transducer.

More specifically, the array 22 of the acoustic sources 24a, 24b, 24n shown in FIG. 2, acoustic sources 24a', 24b', ... 24n' shown in FIG. 4A, or acoustic sources 24a", 24b" and 24n" shown in FIG. 46 are located in a plane perpendicular to the axis Z. The at least one visual sensor 30 or at least two visual sensors 30a, 30b, or video camera (video cameras) incorporate a function of image processing for finding coordinates of the acoustic sound receivers, i.e., the listener's ears R1 and R2, in a plane formed by axes X and Y. The at least one ultrasonic transducer 26 (ultrasonic transducers 26a, 26b) has a function of determining coordinates on the Z axis, and the linking of the at least one ultrasonic transducer 26 (ultrasonic transducers 26a, 26b) with at least one visual sensor (video camera 30) or two visual sensors (video cameras 30a, 30b) and with the array of acoustic sources is the transmission of the X,Y, Z coordinates of the acoustic signal receivers, i.e., the listener's ears R1 and R2, from the central processing unit CPU 28 to the array of acoustic sources for subsequent change of the phases on these acoustic sources.

As any conventional digital video camera, the digital camera 30 (cameral 30a, 30b) is provided with an image processor (not shown). The output of the image processor is linked to the CPU 28 for receiving and processing a digital image in the form of visual signals obtained from camera (cameras). It is understood that in addition to the image processor of the camera 26 (cameras 26a, 26b), the CPU 28 also receives signals from the ultrasonic transducer 26 (ultrasonic transducers 26a, 26b) and from each of the acoustic sources.

Figure 4B:
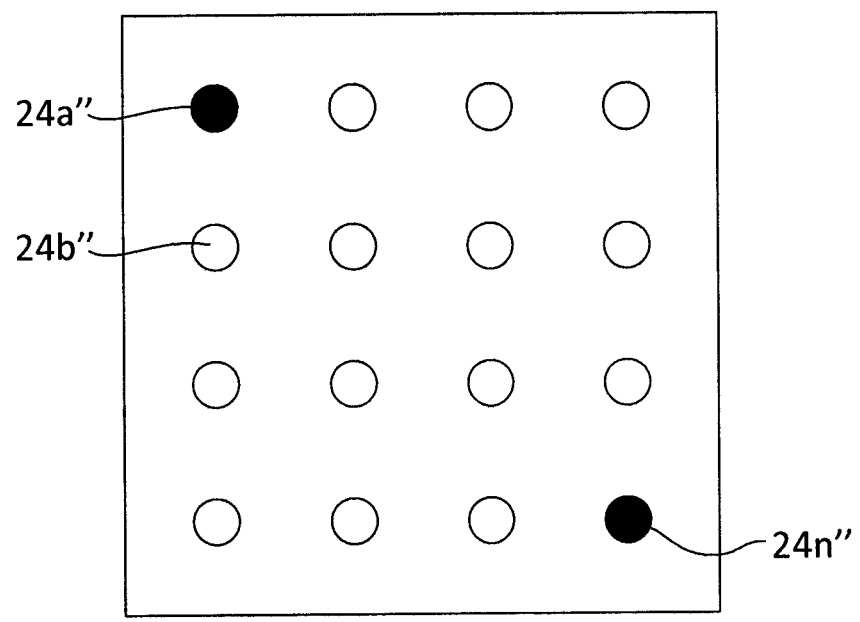
FIG. 4B is a view similar to FIG. 2, wherein two of acoustic sources are used as ultrasonic transducers.

According to another aspect of the system 20 of the invention, the function of the ultrasonic transducer 26 (ultrasonic transducers 26a, 26b) may be accomplished by at least one of the acoustic sources such as an acoustic source 24a'shown in FIG. 4A, or by at least two acoustic sources 24a" and 24n" shown in FIG. 4B. The patterns of FIGS. 4A and 4B are similar to one of FIG. 2, where an array of sixteen acoustic sources is shown.

It is understood that in addition to the image processor of the camera 26 (cameras 26a, 26b), the CPU 28 also receives signals from the ultrasonic transducer 26 (ultrasonic transducers 26a, 26b) and from each of the acoustic sources 24a, 24b, . . . 24n (24a', 24b', . . . 24n'; 24a", 24b', . . . 24n").

Furthermore, the system 20 of the invention contains a carrier frequency modulator 32 for modulating the frequency of the ultrasonic waves emitted from the acoustic sources by using modulation signals. The modulator 32 is a component of a signal transmitting/receiving unit 34 shown in FIG. 5.

The structure and function of the signal transmitting/receiving unit 34 will now be described in more details.

In the modification of the system 20 of the invention with the use of independently working ultrasonic transducer 26 (FIG. 1) or ultrasonic transducers 26a and 26b (FIG. 3), the ultrasonic transducer or ultrasonic transducers work continuously and independently of the acoustic sources 24a, 24b, . . . 24n (FIG. 2).

However, in the modification of the system 20 where a function of the ultrasonic transducer (ultrasonic transducers) is accomplished by one (FIG. 4A) or two (FIG. 4B) of the acoustic sources 24a' or 24a" and 24b", respectively, the operations of the acoustic sources other than those working as ultrasonic transducers has to be interrupted for a short period of time "t" not perceived by the human ears. In other words, the at least one or two ultrasonic transducers 24a' or 24a" and 24b" have a function of interrupting the transmission of the acoustic signals to receive the signal reflected from the acoustic signal receivers R1 and R2. Such an interruption is needed for receiving signals reflected from the listener's ears by the aforementioned ultrasonic transducer 26 (FIG. 1) or ultrasonic transducers 26a and 26b (FIG. 3). This task is accomplished by the signal transmitting/receiving unit 34 shown in FIG. 5.

Figure 5:
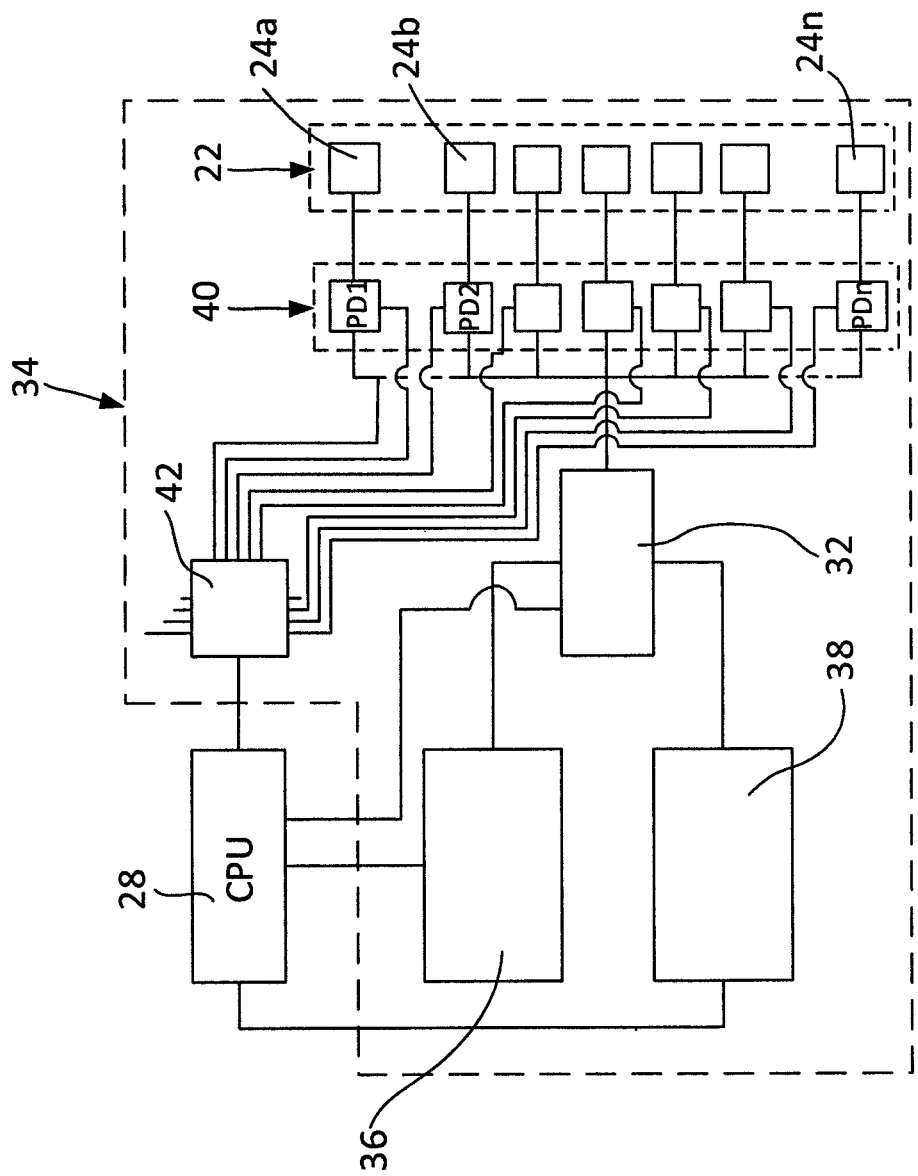
FIG. 5 is a block-diagram of an acoustic signal transmitting/receiving unit in combination with CPU and with the use of one ultrasonic signal generator.

As can be seen from FIG. 5, the signal transmitting/receiving unit 34, which is surrounded by a broken line, contains an audio signal generator 36 for generating audio signals and an ultrasound generator 38 for generating ultrasonic signals. Both these generators are connected to the CPU 28 and to a signal modulator 32 for modulating the generated signals to a required modulation depth.

In the unit of FIG. 5, reference numeral 40 designates a phase-delay array that functions as a controller of phases in individual channels through which the modulated signals are transmitted to the respective individual acoustic sources 24a, 24b, . . . 24n. Reference numeral 42 designates a driver of individual phases in the phase-delay array.

The system may contain two ultrasound signal generators 38' and 38a (See FIG. 6) operating on equal or different carrier frequencies. In case of different frequencies, the first carrier frequency may be, e.g., in the range of 35 kHz to 45 kHz, and the second carrier frequency may be in the range, e.g., of 65 kHz to 69 kHz.

Figure 6:
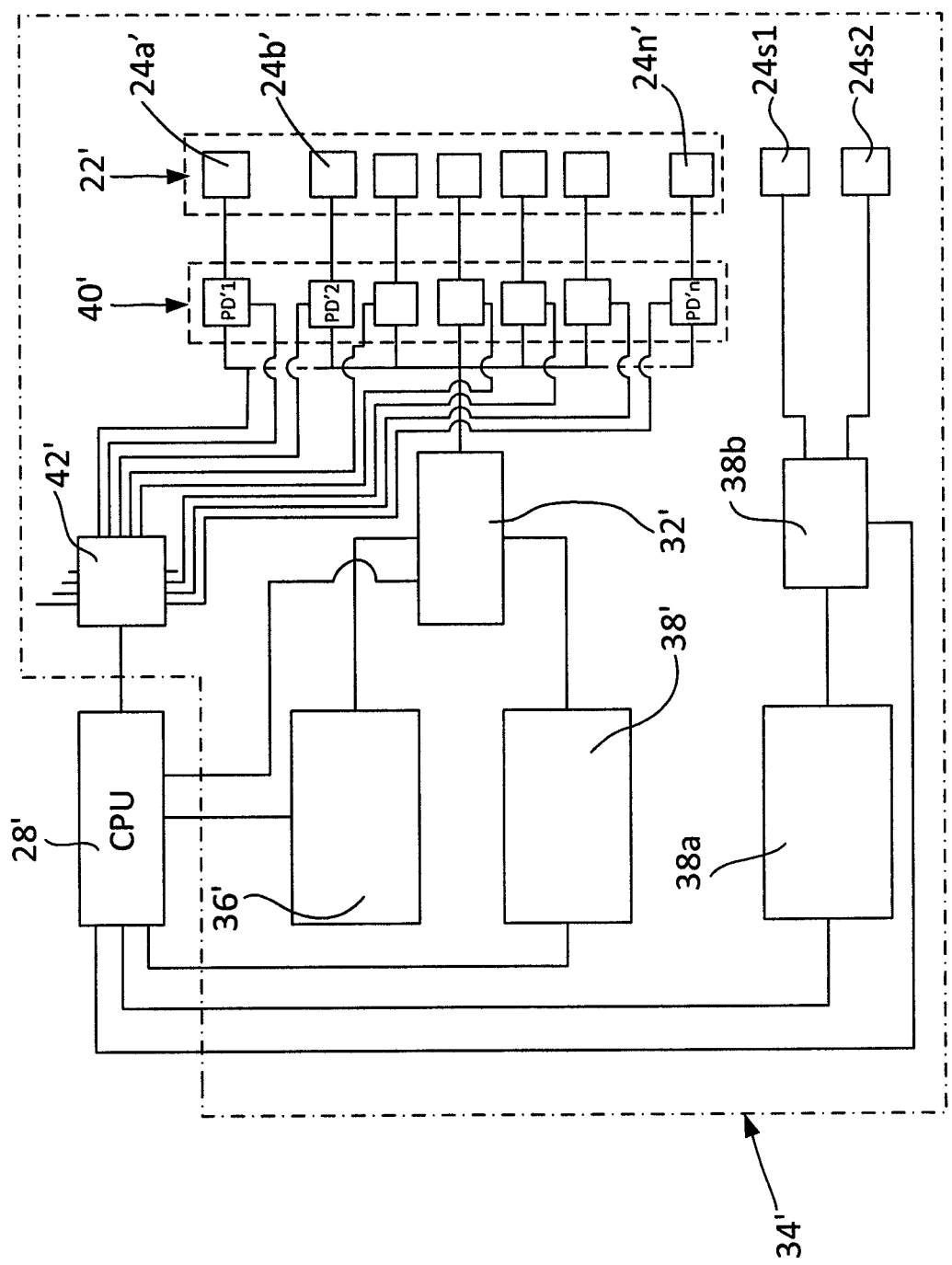
FIG. 6 is a block-diagram of an acoustic signal transmitting/receiving unit in combination with CPU and with the use of two ultrasonic signal generators operating on the same or different frequencies.

The diagram of FIG. 6 is similar to the diagram of FIG. 5 and differs from it by a provision of a second ultrasonic generator 38a, which may be linked to at least one ultrasonic transducer ultrasonic signal transmitter/receiver 24s1 or preferably two ultrasonic transducer ultrasonic signal transmitter/receiver 24s1 and 24s2 via a ultrasonic transducer controller 38b that is connected to the CPU 28'. The use of more than one, e.g., two ultrasonic transducer ultrasonic signal transmitter/receiver 24s1 and 24s2, provides more accurate determination of distances from the ultrasonic transducer to the audio-signal receivers.

Other components of the system shown in FIG. 6, which are identical to those shown in FIG. 5 are designated by the same reference numerals with an addition of primes. Thus, the system of FIG. 6 contains a phase-delay array 40', individual acoustic sources 24a', 24b', . . . . 24n', a driver of individual phases 42', etc. In the scheme of FIG. 6, all individual acoustic sources 24a', 24b', . . . . 24n' operates only as audio signal transmitters on a carrier frequency of the acoustic signal generator 38', while the ultrasonic signal generator operates only for serving the ultrasonic signal transmitter/receivers 24s1 and 24s2.

The system of the invention operates as follows.

Let us first consider the case shown in FIGS. 1, 2, and 3, where all the acoustic sources 24a, 24b, . . . 24n, which are arranged into a pattern, function only as audio signal transmitters which, according to the invention, possess functions of acoustic beam focusing and directing.

For convenience of the description, we will conditionally show it the illustrated schemes the sound waves as beams. Thus, during operation of the system 20 (FIG. 1), in each current instant of time the audio signals shown by sound rays B1 and B2 are emitted by the individual acoustic sources 24a, 24b, 24n and, according to the invention, are directed and focused on the acoustic signal receivers, i.e., the listener's ears R1 and R2, respectively. As described above, the aforementioned directivity of the sound waves is provided by coordinated actions of the digital image-processing camera 30 (FIG. 1) (or cameras 30a, 30b shown in FIG. 3) that determines coordinates of the listener's ears R1 and R2 in an X-Y plane of the X,Y,Z coordinate system and a ultrasonic transducer 26 (FIG. 1) (or ultrasonic transducers 26a and 26b shown in FIG. 3). The data obtained by the camera or cameras and by the ultrasonic transducer or ultrasonic transducers are sent to the CPU which accomplishes all the processing and calculation steps and sends feedback commands for activating and redirecting and refocusing the individual acoustic sources 24a, 24b, 24n in accordance with the calculated data.

In the specific modification of the system shown in FIGS. 1, 2, and 3, a distance from the acoustic sources to the sound receivers R1 and R2, i.e., a current Z coordinate in the X,Y,Z coordinate system, is determined by the ultrasonic transducer or ultrasonic transducers irrespective of the operation of the individual acoustic sources 24a, 24b, 24n, which work continuously, i.e., without interruption. The use of two ultrasonic transducers is advantageous for more accurate direction of the acoustic sounds to the listener. It is understood that in combination with the video-image camera, the accuracy of the location of the receivers is drastically improved.

In contrast to the modification of the system shown in FIGS. 1, 2, 3, in case of the modification shown in FIGS. 4A and 4B, where function of the ultrasonic transducer is accomplished by one individual acoustic source (24a') or two individual acoustic sources (24a", 24n") or by more than two individual acoustic sources (not shown), the continuity of the operation of the individual acoustic sources is interrupted for a moment t which is short enough to be perceived by a human ear. During this time interval t the ultrasonic transducer-functioning individual acoustic sources 24a', or 24a", 24n" receive a signal reflected from the listener's ears R1 and R2 and determines a distance to the ears R1 and R2 by measuring the time need for sensing the ultrasonic signal to the objects (R1 and R2) and for receiving the signal reflected from these objects. The exact time, i.e., the Z coordinate of the plane in which the ears R1 and R2 are located is calculated by the CPU. As mentioned above, the listener L (FIG. 3) will not perceive the interruption of the audio signals emitted from the individual acoustic sources other than the ultrasonic transducers 24a' or 24a' and 24n'. In combination with the data sent to the CPU 28 from the digital image-processing camera 30 (cameras 30a, 30b), the ultrasonic transducers make it possible to determine exact location of the listener's ears R1 and R2 for subsequent focusing and directing the sound rays onto them.

As shown in FIG. 5 and in FIG. 6 the system of the invention contains a phase delay array 40 (40') which assign phases for signals emitted by individual acoustic sources. By controlling the intensities and phase of acoustic beams generated by individual sources, it becomes possible not only to create the converging acoustic beams but also to control direction and focusing B1 and B2 to a listener ears R1 and R2, as shown in FIG. 1 and FIG. 3.

Thus, it has been shown that the invention provides a system of tracking positions of the listener's ears and is intended for 3D perception of audio signals. The use of ultrasonic transducers enhances the action of the digital image-processing video camera and accuracy in positioning the location of the sought objects. Although the invention has been shown and described with reference to specific drawings and text of the patent specification, it is understood that the images on the drawings and their specific descriptions are given only as examples and that any changes and modifications are possible, provided that these changes and modifications do not depart from the scope of the attached patent claims. For example, more than two individual acoustic sources can be used as ultrasonic transducers. More than two digital cameras can be used for locating and determining coordinates of the listener's ears in the X-Y plane of the X,Y,Z coordinate system. The acoustic signal sources can be arranged into a matrix of any shape, e.g., a round shape and the acoustic signal sources in the matrix may have irregular distribution. An infrared digital image-processing camera or cameras can be used instead of a conventional video camera or cameras. The source of acoustic signals is not necessarily an array and the same function can be accomplished by a single acoustic source that possesses a function of scanning an object being sought with a narrow acoustic beam.

The invention claimed is:

1. A system of tracking acoustic signal receivers for 3D perception of audio signals, the system comprising:

an array of acoustic sources for generating acoustic signals comprising audio signals and ultrasonic signals, the array having functions of an acoustic beam focusing and directing;

at least one visual sensor for finding a location of the acoustic signal receivers;

at least one ultrasonic signal generator for generating said ultrasonic signals to be emitted by the array of acoustic sources on at least one carrier frequency;

an audio signal generator for generating said audio signals;

a carrier frequency modulator for modulating the at least one frequency of said ultrasonic waves with the audio signals;

at least one ultrasonic transducer for determining the location of the acoustic signal receivers by transmitting ultrasonic signals and receiving a signal reflected from the acoustic signal receivers; and a central processing unit for linking the at least one ultrasonic transducer with at least one visual sensor and with the array of acoustic sources, wherein, in an orthogonal coordinate system of axes X, Y, and Z, the array of acoustic sources is located in a plane perpendicular to the axis Z, the at least one visual sensor is a digital image-processing video camera that incorporates a function of image processing for finding coordinates of the audio signal receivers in a plane formed by axes X and Y, the at least one ultrasonic transducer has a function of determining coordinates on the Z axis, and wherein the linking of the at least one ultrasonic transducer with the digital image-processing video camera and with the array of acoustic sources comprises transmission of the X,Y,Z coordinates of the acoustic signal receivers from the central processing unit to the array of acoustic sources.

2. A system of tracking acoustic signal receivers for 3D perception of audio signals, the system comprising:

an array of acoustic sources for generating acoustic signals comprising audio signals and ultrasonic signals, the array having functions of an acoustic beam focusing and directing;

at least one visual sensor for finding a location of the acoustic signal receivers;

at least one ultrasonic signal generator for generating said ultrasonic signals to be emitted by the array of acoustic sources on at least one carrier frequency;

an audio signal generator for generating said audio signals;

a carrier frequency modulator for modulating the at least one frequency of said ultrasonic waves with the audio signals;

at least one ultrasonic transducer for determining the location of the acoustic signal receivers by transmitting ultrasonic signals and receiving a signal reflected from the acoustic signal receivers;

a central processing unit for linking the at least one ultrasonic transducer with at least one visual sensor and with the array of acoustic sources, wherein the at least one ultrasonic transducer is selected from the group consisting of acoustic sources of the array and the acoustic sources other than the acoustic sources of the array;

a first ultrasonic signal generator operating on a first frequency, a second ultrasonic signal generator operating on a second frequency, and generator controller for selectively connecting the first ultrasonic signal generator and the second ultrasonic signal generator to the at least one ultrasonic transducer, wherein the first frequency and the second frequency are even or different, and wherein, in an orthogonal coordinate system of axes X, Y, and Z, the array of acoustic sources is located in a plane perpendicular to the axis Z, the at least one visual sensor is a digital image-processing video camera that incorporates a function of image processing for finding coordinates of the audio signal receivers in a plane formed by axes X and Y, the at least one ultrasonic transducer has a function of determining coordinates on the Z axis, and wherein the linking of the at least one ultrasonic transducer with the digital image-processing video camera and with the array of acoustic sources comprises transmission of the X,Y,Z coordinates of the acoustic signal receivers from the central processing unit to the array of acoustic sources.

* * * * *